March 22, 1938.  E. C. HORTON  2,112,198
MOTOR VEHICLE CONSTRUCTION
Filed Sept. 30, 1933  2 Sheets-Sheet 1
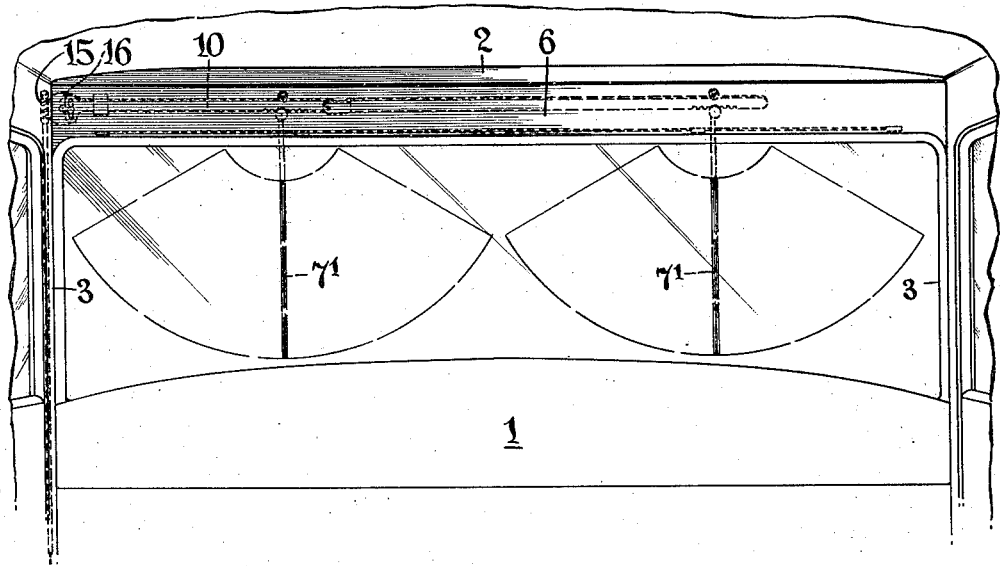
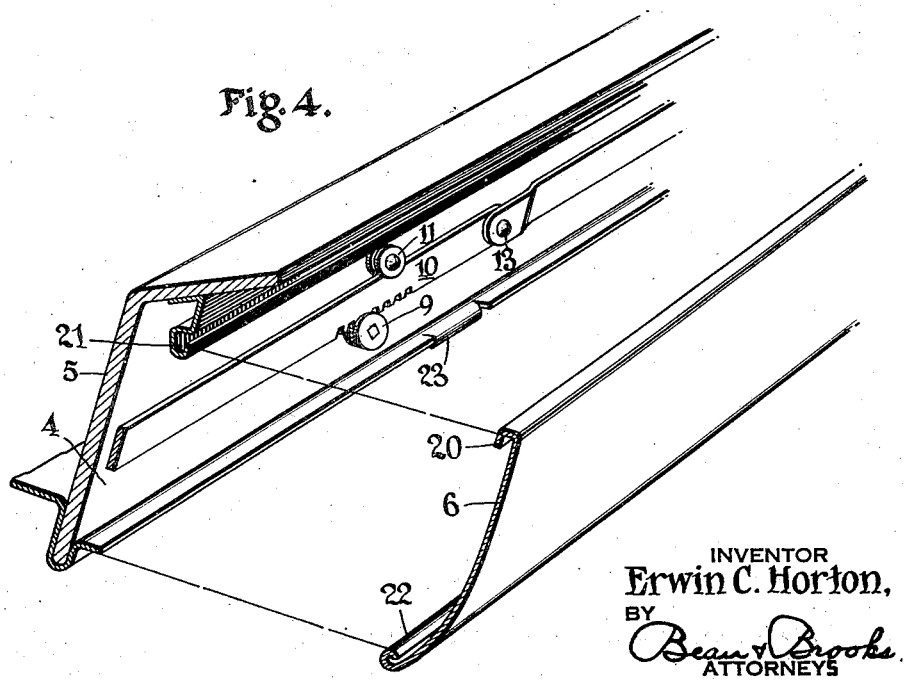
INVENTOR
Erwin C. Horton,
BY
ATTORNEYS March 22, 1938. E. C. HORTON 2,112,198
MOTOR VEHICLE CONSTRUCTION
Filed Sept. 30, 1933 2 Sheets-Sheet 2
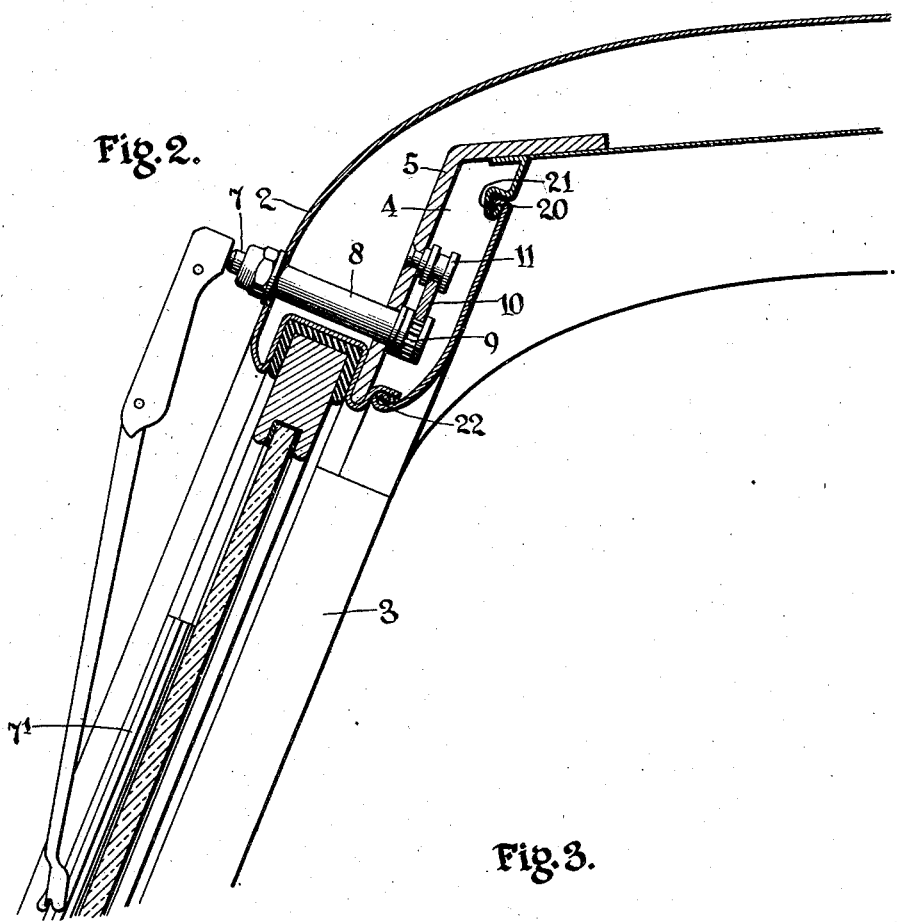
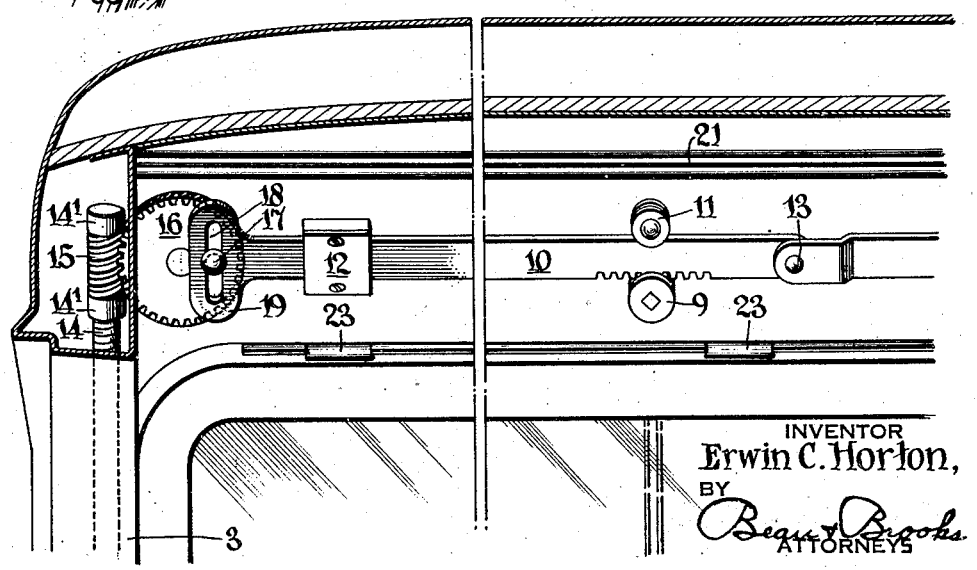
INVENTOR
Erwin C. Horton,
BY
ATTORNEYS Patented Mar. 22, 1938

2,112,198

UNITED STATES PATENT OFFICE 2,112,198

MOTOR VEHICLE CONSTRUCTION

Erwin C. Horton, Hamburg, N. Y., assignor to Trico Products Corporation, Buffalo, N. Y.

Application September 30, 1933, Serial No. 691,709

10 Claims. (Cl. 15—255)

This invention relates to a motor vehicle body construction. It has previously been the practice to mount the windshield cleaner motor in an exposed position either at the forward side or the rearward side of the windshield, which exposure not only left the motor unprotected but also detracted from the appearance and finish of the motor vehicle. The primary object of this invention comprehends the incorporation of the windshield cleaner mechanism within the body structure framing the windshield so as to constitute a built-in part of the body fabrication rather than a mere attachment at the exterior side thereof, the built-in mechanism being rendered accessible upon the removal of the enclosing wall structure or a portion thereof within the vehicle.

The invention further has for its object to provide a body structure incorporating a windshield cleaner mechanism in which the wiper driving mechanism is embodied and disposed for the accomplishment of its purpose in a most practical and efficient manner.

In the drawings:

Fig. 1 is a view of the windshield from within a motor vehicle;

Fig. 2 is a fragmentary vertical cross section through the upper portion thereof;

Fig. 3 is a broken view illustrating in part the cleaner installation; and

Fig. 4 is a detail perspective view of the header structure with the removable panel separated.

Referring more particularly to the drawings, the windshield glass of a motor vehicle is framed by the vehicle body portion that includes the upper section or header structure 2, the side posts or standards 3, and the lower section which may include the instrument board 1. The framing body portion, preferably either in the upper section or the lower section thereof and herein depicted in the upper or header structure, is provided with an inner chamber 4 which according to the present disclosure has a back wall defined by a transverse body member 5 and a removable front closure wall in the form of a finishing panel 6. The transverse body member provides substantial support for the windshield cleaner mechanism which may comprise one or more wiper actuating shafts 7 journalled in the bearings 8 of the header structure, and each shaft carrying a pinion 9 on its inner end for driving mesh with the rack member 10. The meshing relation is maintained by an opposing idler or a guide roller 11 and also through a guide bearing 12 fixed to the inner face of the frame member and slidably supporting the rack member. The rack member may be composed of articulated sections for greater efficiency, the sections being pivoted as at 13.

The rack member may be driven from a moving part of the motor vehicle such as the engine shaft, this power being transmitted through a rotating flexible shaft 14 housed within one of the upright posts 3 and carrying on its upper end a worm 15 which is in mesh with a worm gear 16. The flexible shaft may have its upper end journalled in bearing 14' so disposed as to axially aline the shaft and worm with the latter tangent to the gear 16. This will avoid unnecessary bending of the flexible shaft 14 in the windshield frame, and permit the worm gear 16 to be disposed in the corner of the windshield framing structure.

This arrangement furthermore disposes the entire upper portion of the cleaner mechanism within easy access for installation of parts and their repair, such access being had upon the removal of the panel 6 which latter is substantially coextensive with the motion translating and converting mechanism, and the removal of which opens such mechanism to clear view for inspection without necessitating the entire dismantling of the adjacent body structure.

The motion translating mechanism, comprising the worm 15 and the gear 16, is thus disposed to one side and is given substantial support by the adjacent columnar side framing. A wrist pin 17 on gear 16 operates in the slot 18 of cross head 19 to convert its rotary motion into reciprocatory motion for sliding the rack 10 back and forth and, through the rack and pinion connections, oscillate the wipers 7'.

The removable panel 6 may be readily placed and displaced so that entrance to the cleaner mechanism is readily gained. To this end, the panel may be interlocked in position rather than by attaching screws. Thus, the panel may have an overhanging flange 20 along its upper edge for being hooked or engaged in the depending groove 21 in chamber 4, and thereafter the bead 22 on the panel's lower edge may be pressed or snapped into engagement with one or more marginal spring seats 23. By simply disengaging the bead from its seat the panel may be removed to open the chamber contained mechanism of the windshield cleaner, and thus enable quick repair and replacement of parts.

By housing the cleaner mechanism within the windshield framing structure of the body, the sound of operation, incidental to the motion translation and conversion wherein the rotary drive motion is changed first into reciprocatory and then into oscillatory motion, is muffled and baffled. The header transmission, including the gear 16, the rack 10 and the pinion 9, may be removed simply by opening the guide bearing 12, removing the guide roller 11, and withdrawing the worm gear from meshing relation with the worm 15, so that the entire mechanism may be removed from the chamber.

There is thus provided a mechanical drive for a windshield cleaner mechanism in which the motion translating and converting means are readily detachable from the drive shaft and its worm, the structure being embodied within the vehicle body fabrication so as to permit ready repair and replacement without dismantling the entire body structure.

The rotary flexible shaft 14 may be readily installed and replaced by simply withdrawing the same from the channel or chamber extending through the adjacent post or standard 3, the chamber of this post preferably communicating with the header chamber as is suggested in Fig. 3. The header chamber therefore contains practically all of the motion translating and converting mechanism for transmitting the rotary drive over to the windshield wiper to oscillate the same. The installation and mounting of the several mechanical parts enables the same to be readily reached and also provides a concealment and housing which renders the mechanism practically silent in its operation.

What is claimed is:

1. A motor vehicle body construction having a windshield and a framing body structure, such framing body structure having a chamber with a forward wall and a removable interior panel by the removal of which latter access is gained to the chamber, means releasably securing the panel in chamber closing position, a windshield wiper, a shaft operatively connected to the wiper and journalled in the forward wall of the structure, and mechanism disposed in the chamber free of the removable wall and operatively connected to the wiper actuating shaft for operating the latter, said mechanism being accessible upon the opening of the chamber by the removal of said panel.

2. A motor vehicle body construction having a windshield and a framing body structure including a header and a supporting side column having intercommunicating chambers, the header being provided with a removable panel by which access is gained to its chamber, means releasably securing the panel in chamber closing position, a windshield wiper, a shaft operatively connected to the wiper and journalled in the header, and mechanism disposed in the chambers of said header and supporting column and operatively connected to the wiper actuating shaft for operating the latter, said mechanism being rendered accessible upon the opening of the header chamber by the removal of said panel.

3. In a motor vehicle, a windshield having a chambered framing member provided with a removable panel at the inner side thereof for being removed from within the motor vehicle to gain access to the chamber of said member, a wiper operating shaft journalled on said windshield framing member, and means free of such removable panel for operating said shaft including an operating member operatively connected to said shaft and movable back and forth in the chamber of said framing member, said removable panel being at least coextensive with the path of movement of said operating member whereby the latter is rendered accessible for repair or replacement in any position of said operating member and upon removal of said panel.

4. In a motor vehicle, a windshield and a framing body structure therefor, said structure having a chambered frame member and an angularly disposed chambered frame member joining therewith, a windshield wiper, wiper operating mechanism operatively connected to the wiper and disposed in the first chamber, a drive member supported by and housed in said second frame member, and transmission means disposed in the angle formed by said frame members and operatively connecting said mechanism to said drive member, said transmission means embodying separable parts enabling displacement of the mechanism from the first chamber, and an interiorly disposed closure panel for the first chamber removable from the interior of the vehicle to give access to said mechanism and to said transmission means whereby replacement and repair of said parts may be made.

5. A motor vehicle body construction having a windshield header provided with a chamber and a transversely extending frame member intermediate the front and back wall portions of the chamber to provide a support for cleaner mechanism, and an interior removable closure panel for the chamber, a wiper actuating shaft journalled on the member and extending into the chamber thereof, removable shaft operating mechanism including a rotatable driving member and motion translating and converting means connecting the driving member to the wiper actuating shaft, said means being disposed within the chamber and accessible from the interior of the vehicle upon removal of said closure panel, and means removably supporting the panel in chamber closing position.

6. A motor vehicle body construction having a windshield with a framing body structure of substantially rectangular form, said structure being provided with a chamber and a cover panel closing the chamber and removable to give access to the chamber, a windshield wiper, mechanism within the chamber for operating the wiper back and forth on the outside of the windshield glass, said mechanism including a worm gear disposed at one corner of the framing structure and operatively connected to the wiper, and a drive for said worm gear including a worm meshing with and disposed substantially tangential to the worm gear and substantially transversely of the chamber, means supporting the worm and worm gear for relative separation to permit of repair of the mechanism, and a flexible drive for driving said worm.

7. A motor vehicle body construction having a windshield and a framing body structure, such framing body structure having a transverse frame member providing a front wall and a rearwardly extending top wall of a chamber, a removable interior panel defining with said walls a chamber and by removability of which access is gained to the chamber, means releasably securing the panel in chamber closing position, a windshield wiper, a shaft operatively connected to the wiper and journalled in the structure, and mechanism disposed in the chamber and operatively connected to the shaft for transmitting motion from a source of power to operate the wiper actuating shaft, said mechanism being rendered accessible upon the opening of said chamber by the removal of said panel, such panel being free and independent of the wiper and its actuating mechanism whereby the latter will remain intact during the removal and replacement of the panel.

8. A motor vehicle body construction having a windshield with a framing body structure of substantially rectangular form, said structure being provided with a chamber and a cover panel closing the chamber and removable to give access to the chamber, a windshield wiper, such chamber being disposed rearwardly of the plane of the windshield, mechanism within the chamber and connected to the wiper for operating the wiper back and forth on the outside of the windshield glass, said mechanism being mounted on the forward wall of the chamber and covered by the removable cover panel, and a drive for said mechanism.

9. A motor vehicle body construction having a windshield with a framing body structure, said structure being provided with a chamber and a cover panel closing the chamber and removable to give access to the chamber, a windshield wiper, such chamber being disposed rearwardly of the plane of the windshield, mechanism within the chamber and connected to the wiper for operating the wiper back and forth on the outside of the windshield glass, said mechanism being mounted on the forward wall of the chamber and covered by the removable cover panel, and a drive for said mechanism.

10. A motor vehicle body construction having a window and a framing structure adjacent thereto, said structure having interconnecting chambers respectively disposed adjacent different marginal portions of said window and said framing structure having associated therewith a removable panel by which access is gained to the adjacent chamber, means releasably securing the panel in chamber closing position, a window wiper, a shaft operatively connected to the wiper and journalled in said framing structure, and mechanism disposed in said interconnecting chambers and operatively connected to the wiper actuating shaft for operating the latter.

ERWIN C. HORTON.